United States Patent
Abdi et al.

[11] Patent Number: 5,834,033
[45] Date of Patent: Nov. 10, 1998

[54] APPARATUS FOR MELT SPINNING FEEDSTOCK MATERIAL HAVING A FLOW RESTRICTING RING

[75] Inventors: Mesfin Abdi; Claude Bayard, both of Arlington; James H. Perkins, Cross Junction, all of Va.

[73] Assignee: Fuisz Technologies Ltd., Chantilly, Va.

[21] Appl. No.: 854,344

[22] Filed: May 12, 1997

[51] Int. Cl.⁶ ................................................ B29C 47/00
[52] U.S. Cl. .................................................... 425/8; 425/9
[58] Field of Search ........................... 425/6, 8, 9; 264/8, 264/164, 211.1

[56] References Cited

U.S. PATENT DOCUMENTS

| | | | |
|---|---|---|---|
| 2,005,987 | 6/1935 | Bowen | 425/8 |
| 3,070,045 | 12/1962 | Bowe | 107/8 |
| 3,073,262 | 1/1963 | Bowe | 107/8 |
| 3,649,234 | 3/1972 | Charpentier | 264/164 |
| 3,930,043 | 12/1975 | Warning et al. | 426/515 |
| 4,270,943 | 6/1981 | Riddell et al. | 264/8 |
| 4,855,326 | 8/1989 | Fuisz | 514/777 |
| 5,011,532 | 4/1991 | Fuisz | 106/215 |
| 5,236,734 | 8/1993 | Fuisz | 426/641 |
| 5,238,696 | 8/1993 | Fuisz | 426/565 |
| 5,427,811 | 6/1995 | Fuisz et al. | 426/465 |
| 5,447,423 | 9/1995 | Fuisz et al. | 264/8 |
| 5,458,823 | 10/1995 | Perkins et al. | 264/8 |

FOREIGN PATENT DOCUMENTS

| | | | |
|---|---|---|---|
| 274493 | 7/1951 | Switzerland | 264/8 |

*Primary Examiner*—Jay H. Woo
*Assistant Examiner*—Robert Hopkins
*Attorney, Agent, or Firm*—John F. Levis

[57] ABSTRACT

A spinner head provides for the production of high fat content floss. The spinner head includes a base and a cover spaced from the base. A plurality of discrete spaced apart elongate heating elements are positioned between the base and the cover and define a chamber for accommodating feedstock material therein. The chamber is spun and the feedstock material is heated and is expelled through the spaces between the heating elements. Feedstock engagement surfaces are positioned in alignment with each of the spaces between the heating elements so as to engage the expelled feedstock to alter the direction of travel of the expelled product.

29 Claims, 9 Drawing Sheets

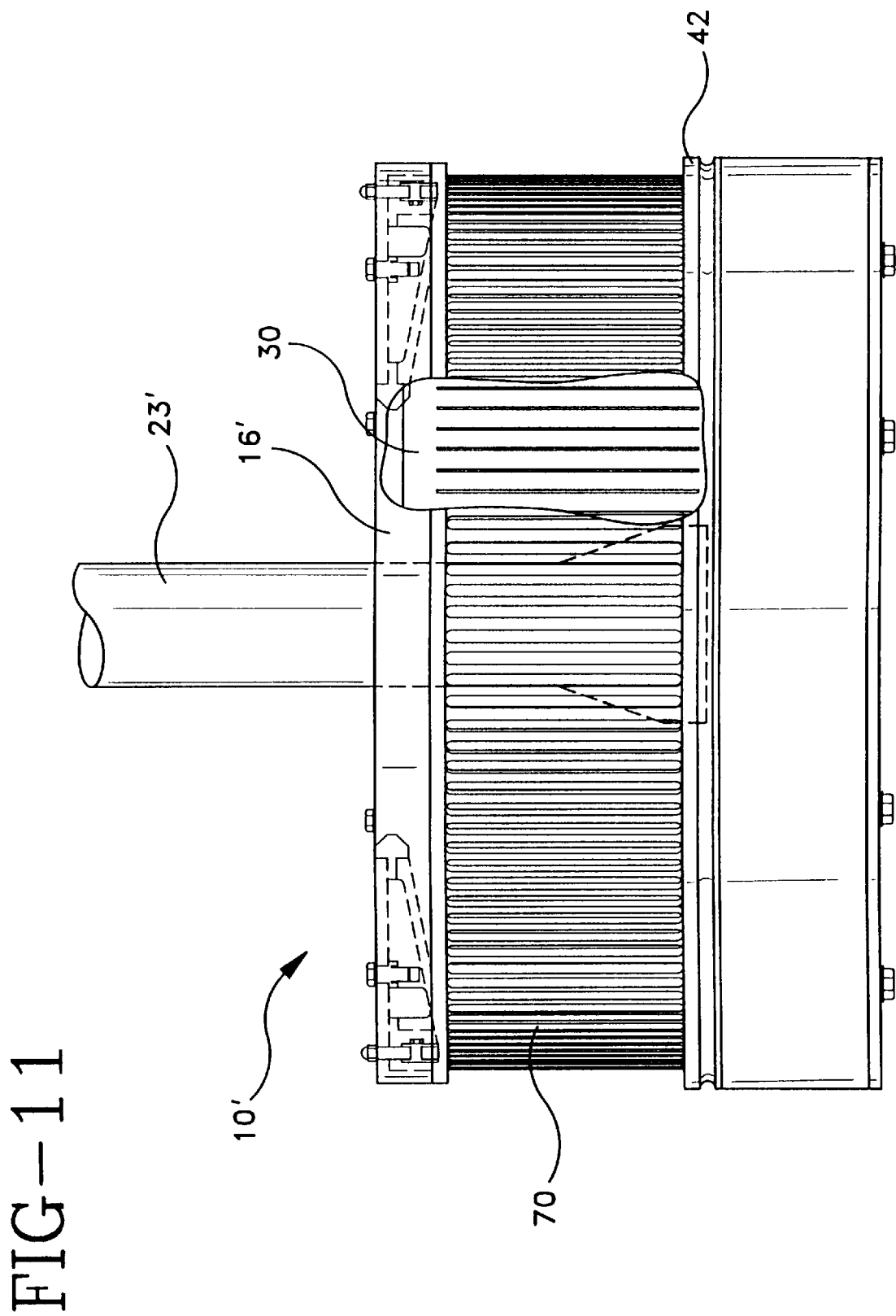

APPARATUS FOR MELT SPINNING FEEDSTOCK MATERIAL HAVING A FLOW RESTRICTING RING

FIELD OF THE INVENTION

The present invention relates generally to an apparatus for heating and spinning feedstock materials. More particularly, the present invention relates to an improved spinner head device having a flow restricting member which impedes the flow of material expelled from the spinner head where the resistance to flow of the feedstock material is reduced under conditions of heat and pressure and more particularly through an intraparticle flash flow process.

BACKGROUND OF THE INVENTION

Various machines have been devised for the melting and spinning of meltable materials, especially sugar. The meltable material is introduced into a spinning head of a spinning machine in solid form. The material is melted therein just prior to be spun out from the spinner head where it solidifies in the air. The process of melt spinning sugar is most commonly seen in the manufacture of floss-like cotton candy.

Numerous machines have been specifically designed for melt spinning cotton candy. Examples of such machines are shown in U.S. Pat. Nos. 3,930,043, 3,073,262 and 3,070,045. These prior art cotton candy forming spinning machines generally include a spinner head having a cylindrical apertured wall. Sugar in solid form is introduced into the spinner head where it is melted. The spinning of the spinner head causes the melted sugar to be spun out through the apertures in the cylindrical wall where it solidifies into the floss-like structure referred to as cotton candy. The characteristic shape and consistency of the spun material is influenced by many factors. These factors include size and construction of the spinner head, size, arrangement and location of the apertures in the cylindrical wall, as well as the manner in which heat is applied to the spinner head.

While typical cotton candy machines of the prior art serve adequately in converting granular sugar into floss-like cotton candy, these cotton candy spinner heads do not produce material with repeatable consistency and therefore their use is not entirely satisfactory for spinning other materials, or other materials in combination with sugar. The art has seen a need for commercial spinner heads which produce repeatedly reliable material consistency so that the melt spinning of sugar as well as other materials, sugar combined with other materials as well as non-saccharide materials both for use in foodstuffs and pharmaceuticals, may be reliably achieved. U.S. Pat. No. 4,855,326 describes a melt-spin process for production of materials having pharmacological properties. U.S. Pat. No. 5,011,532 concerns the melt-spin production of oleaginous substances.

The art has also seen other advances in the spinner head construction for the production of various materials. For instance, U.S. Pat. No. 5,427,811 issued Jun. 27, 1995 which is incorporated by reference herein, discloses a method and apparatus for spinning thermo-flow materials. The apparatus described therein includes a rotatable spinner head having a helical heating cable defining an annular processing wall having spaces between the heating cable through which material is propelled as the spinner head is rotated. The apparatus described in the '811 patent subjects the material to thermo-flow melt spin processing referred to as "flash flow". Other commonly assigned patents describing the flash flow process include U.S. Pat. No. 5,447,423 issued Sep. 5, 1995, U.S. Pat. No. 5,236,734 issued Aug. 17, 1973 and U.S. Pat. No. 5,238,696 issued Aug. 24, 1993.

Another technique for processing material in a melt spin environment is to subject the material to "liquiflash" processing where reduction of the feedstock material occurs under conditions of heat and pressure so that any resistance of the material to liquid flow, i.e. viscosity which impedes the propensity to form liquid droplets, is eliminated. A method of forming liquiflash material is described in commonly assigned pending U.S. patent application Ser. No. 08/330,412 filed Oct. 28, 1994, now U.S. Pat. No. 5,683,720 and bearing Attorney Docket No. 447-120 and which is incorporated by reference herein.

The liquiflash and flash-flow processes may be employed with various feedstock materials, specifically various foodstuffs including saccharides and non-saccharides as well as pharmaceuticals and combinations thereof. One apparatus which has been developed which is particularly suitable for spinning various foodstuffs and pharmaceuticals is shown and described in commonly assigned U.S. Pat. No. 5,458,823 issued Oct. 17, 1995 which is incorporated by reference herein. This patent discloses a spinner head having a plurality of discrete, closely spaced elongate heating elements disposed between a base and a cover. Feedstock material which is introduced into the spinner head may be expelled through the spaces formed between the heating elements.

In order to more efficiently produce pharmaceutical products, the spinner head of the '823 patent discloses an annular housing assembly formed of heat conductive material which is positioned over the heating elements. The heating elements are therefore isolated from the feedstock material by the annular housing assembly. In order to permit expulsion of feedstock material form the spinner head, the wall of the annular housing includes a plurality of slot-like openings through which the material may be expelled. The spinner head of the '823 patent is especially useful in the manufacture of pharmaceutical material in that in order to prevent contamination of reformed product, the annular housing may be easily removed from the heating elements so as to permit thorough cleaning.

While each of the above-identified devices has been found to be suitable for its intended purposes, i.e. the formation of spun material from saccharides, pharmaceuticals and combinations thereof, it has been found that one combination of material which is particularly difficult to melt-spin is a combination of saccharides and oleaginous substances such as the mixture of fat and sugar in the formation of foodstuffs. Heretofore it has been difficult to produce melt spun product with high fat to oil ratio. Prior attempts to melt-spin high fat-content saccharide materials resulted in a melt spun product which required a greater degree of mixing in order to incorporate the material into a final foodstuff product.

Accordingly, it is desirable to provide a spinner head apparatus which is capable of producing melt spun product from a feedstock material which includes a high content of oleaginous product mixed with saccharides.

SUMMARY OF THE INVENTION

The present invention provides for a spinner head that comprises a base, a cover aligned with and spaced from the base, and a plurality of discrete elongate heating elements defining elongate spaces between them, the heating elements being positioned between the base and the cover to define a perimetrical configuration. The base, cover and heating elements mutually define a chamber for accommodating therein a solid non-solubilized feedstock material capable of undergoing physical transformation with the application of heat and force. In addition the defined chamber is spinnable for expelling the feedstock material through the spaces between the heating elements to effect the transformation of the feedstock material. Disposed exteriorly about the perimetrical configuration defined by the heating elements is a feedstock engagement means which includes elongate wall portions spaced radially from and directly aligned with the spaces between the heating elements for contacting the feedstock directly as it is expelled so as to alter the direction of travel of the expelled feedstock.

In particular the present invention provides for a flow restricting device for use in a spinner head having an annular processing housing including elongate slots through which feedstock material is expelled. The flow restricting device includes an annular member disposed exteriorly about the spinner head annular housing, the annular member having feedstock engagement surfaces aligned and coexistive with the slots of the housing for altering the direction of travel of expelled feedstock.

As a result of the present invention, the morphology of the product exiting the spinner head can be controlled so that floss, flakes, or microspheres are produced.

It is therefore, an advantage of the present invention to provide an improved apparatus for processing feedstock materials in a spinner head.

It is a further advantage of the present invention to provide a spinner head which restricts the flow of processed material exiting the spinner head.

It is a still further advantage of the present invention to provide a restricting ring exteriorly about a spinner head apparatus to restrict the flow of processed material exiting therefrom.

BRIEF DESCRIPTION OF THE DRAWINGS

FIG. 11 shows a further embodiment of the spinner head of the present invention which may be suspended from above.

DETAILED DESCRIPTION OF THE PREFERRED EMBODIMENTS

Figure 1:
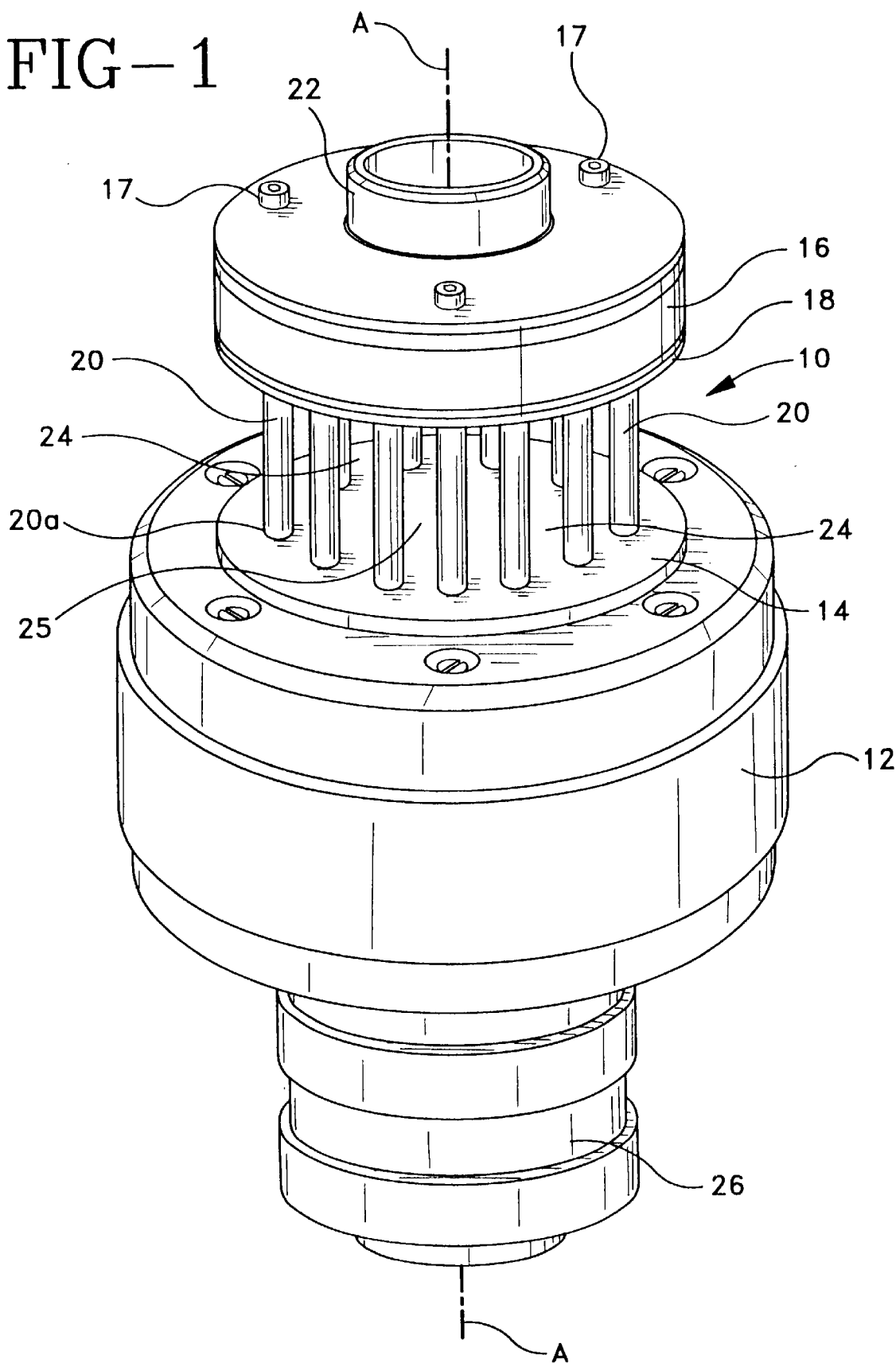
FIG. 1 is a prospective view of a spinner head used in accordance with the present invention.

The present invention contemplates subjecting solid, non-solubilized feedstock material (feedstock) which is capable of undergoing intraparticle flash flow processing or liquiflash processing at a temperature sufficient to reduce the infrastructure of the feedstock material to physically cause the material to deform and pass through an opening under force. The force used in the present invention is centrifugal force provided by a spinner head from which the feedstock material is expelled. Generally, no external force is necessary to be imposed upon the feedstock material after is has been expelled from the spinner head other than the resistance provided by ambient atmosphere. Feedstock materials so expelled rapidly reform as a solid having changed morphology as a result of the material being subjected to the flash flow or liquiflash processing.

The present invention may be employed in combination with liquiflash processing, as well as flash flow processing. Liquiflash processing comprises the reduction of the feedstock material under conditions of heat and pressure to a condition wherein any resistance to liquid flow, e.g. viscosity which impedes the propensity to form liquid droplets, is eliminated. On a macro scale this conditions appears to provide a liquid or liqui-form which terms are used interchangeably herein. With liquiflash processing once the feedstock is reduced to a condition where substantially all resistance to liquid flow is removed, shear forces are imparted to the flowing feedstock in amounts sufficient to separate individual or discrete particles from the mass. The particles produced by this separation process have size and shape influenced only by the natural mass separation of the flowing feedstock in the presence of impinging shear force.

More particularly, the present invention may be employed in combination with flash flow processing technology. Flash flow is referred to as a phenomena which occurs when solid material is subject to conditions of temperature and shear sufficient to provide internal flow of the material at a subparticle level. The solid material undergoes thermo-flow, that is, material undergoes intraparticle flow when heated prior to undergoing substantial degradation or decomposition. As used in the present invention, the flash flow phenomena is effected when the material is exposed to heat for a short amount of time, not more than one second and preferably on the order of tenths of a second. The phenomena can be produced by relatively high speed distribution of the thermo-flow material to the environment of elevated temperature under constant force such as centrifugal force caused by the high speed rotation of the spinner head.

As indicated above, the morphology of the reformed product is influenced by, among other factors, the size and shape of the openings through which the reformed product exits the spinner head. By controlling the amount of heat applied to the spinner head, speed of the revolutions, among other factors, as well as the opening through which the thermo-flow product is expelled, the present invention provides the ability to control the morphology of the material expelled from the spinner head.

As the present invention advantageously provides melt spun material having high fat to sugar content, the present invention, in its preferred embodiment, employs the flash flow process to form material having primarily floss morphology. Such material is generally formed by having the thermo-flow material traverse a tortuous path as it exits the spinner head so that the formation of floss is enhanced. While the present invention may also be employed to form structures such as flakes, as well as microspheres in a liquiflash process, a preferred embodiment of the present invention employs flash flow processing to form.

In producing a floss product by the flash flow process it has been found that certain structural characteristics of the spinner head yield higher floss production with less formation of beads and less crystal contamination, i.e. un-processed material. Beads or microspheres are not desirable in floss as beads have a tendency to have an undesirable "mouth feel". The ability to produce floss is affected by various factors such as expelling the melted material against a cooler surface, decreasing the exit velocity of the material and blocking the material as it exits the spinner head chamber so as to force the melted material into a tortuous path. Present invention takes advantage of these factors so as to provide a spinner head configuration which yields a high floss content.

Referring now to FIG. 1 of the drawings, a spinner head 10 used in accordance with the present invention is shown. Spinner head 10 is generally employed in the manner similar to a conventional cotton-candy spinning machine used to expel feedstock which has been processed within the spinner head into a collection basin or bin (not shown). Use of collection bins in combination with conventional spinner heads to form floss-like cotton candy from sugar is well known in the art.

Spinner head 10 includes a generally cylindrical base 12 including a planar bottom and a heat insulating support 14. Spaced above base 12 is a generally cylindrical cover 16 including a top heat insulating support 18. Appropriate mechanical structures such as bolts 17 may be employed to support cover 16 in spaced relationship over base 12. Base 12 and cover 16 may be formed from stainless steel or other suitable material.

Figure 10:
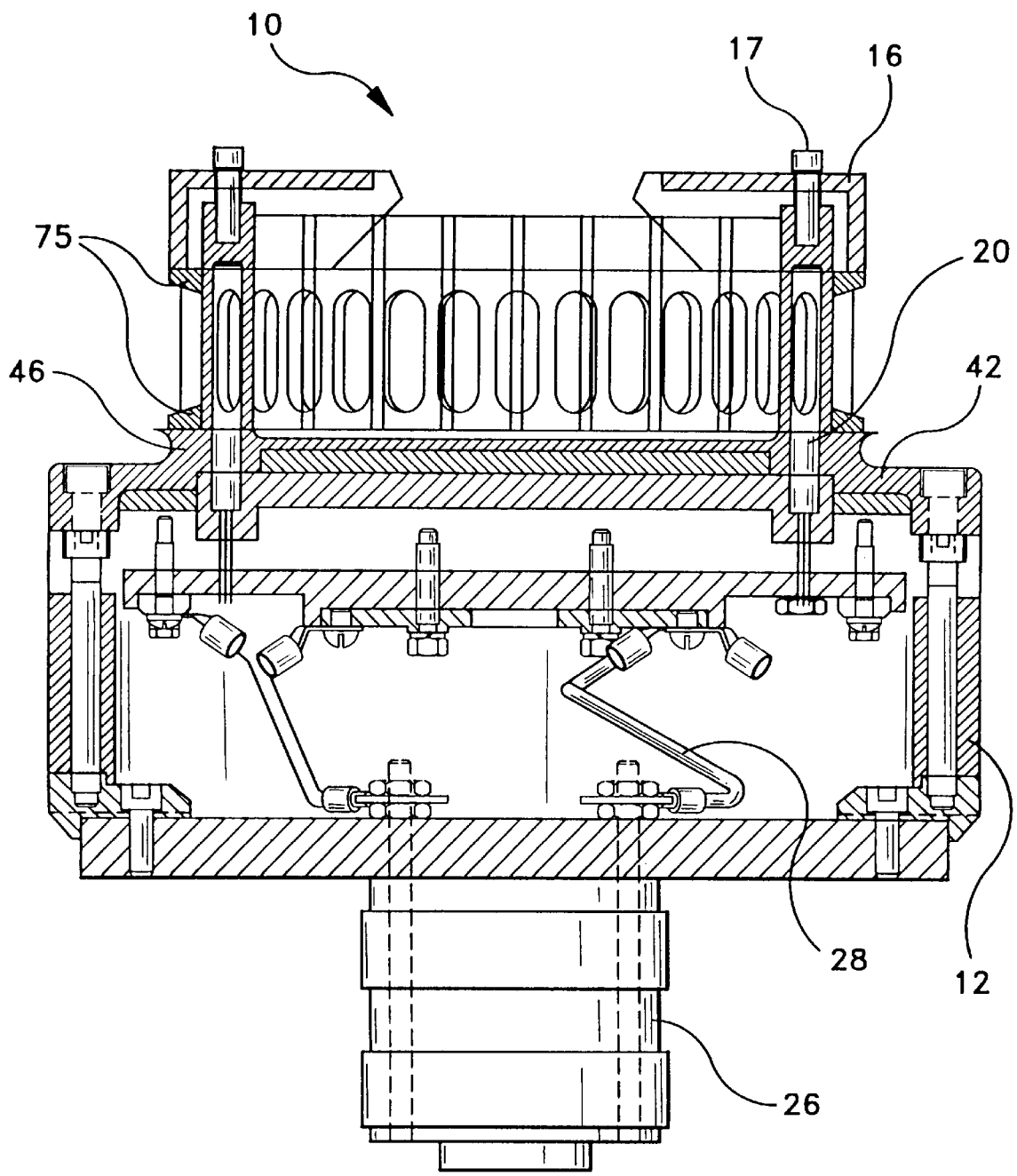
FIG. 10 shows the spinner head of the present invention, partly in section, with the split restricting ring of FIG. 8 and the supporting collar of FIG. 9 shown in place.

Extending between base 12 and cover 16 are a plurality of individual tubular heating elements 20 which are arranged in a generally circular array 20a about a central axis of a rotation A. Base 12, cover 16 and the tubular heating elements 20 define a chamber 25 for accommodating therein feedstock material. The individual tubular heating elements 20 provide the heat necessary to effect a physical transformation of the feedstock material contained in chamber 25. In order to insert the feedstock into the chamber 25 of spinner head 10, cover 16 includes a generally centrally located opening 22. A stem 26 extends centrally downwardly from base 12 and includes an appropriate mechanism (not shown) providing for the rotation of spinner head about axis A in a manner which is well known in the spinner head art. Base 12 also houses an electrical interface assembly 28 (FIG. 10) which powers tubular heating elements 20.

The ability of spinner head 10 to accommodate feedstock material within chamber 25 and to provide the appropriate application of heat and pressure to expel reformed product from the spaces 24 between tubular heating elements 20, is shown and described in further detail in commonly assigned U.S. Pat. No. 5,458,823 which has been incorporated by reference herein.

Figure 2:
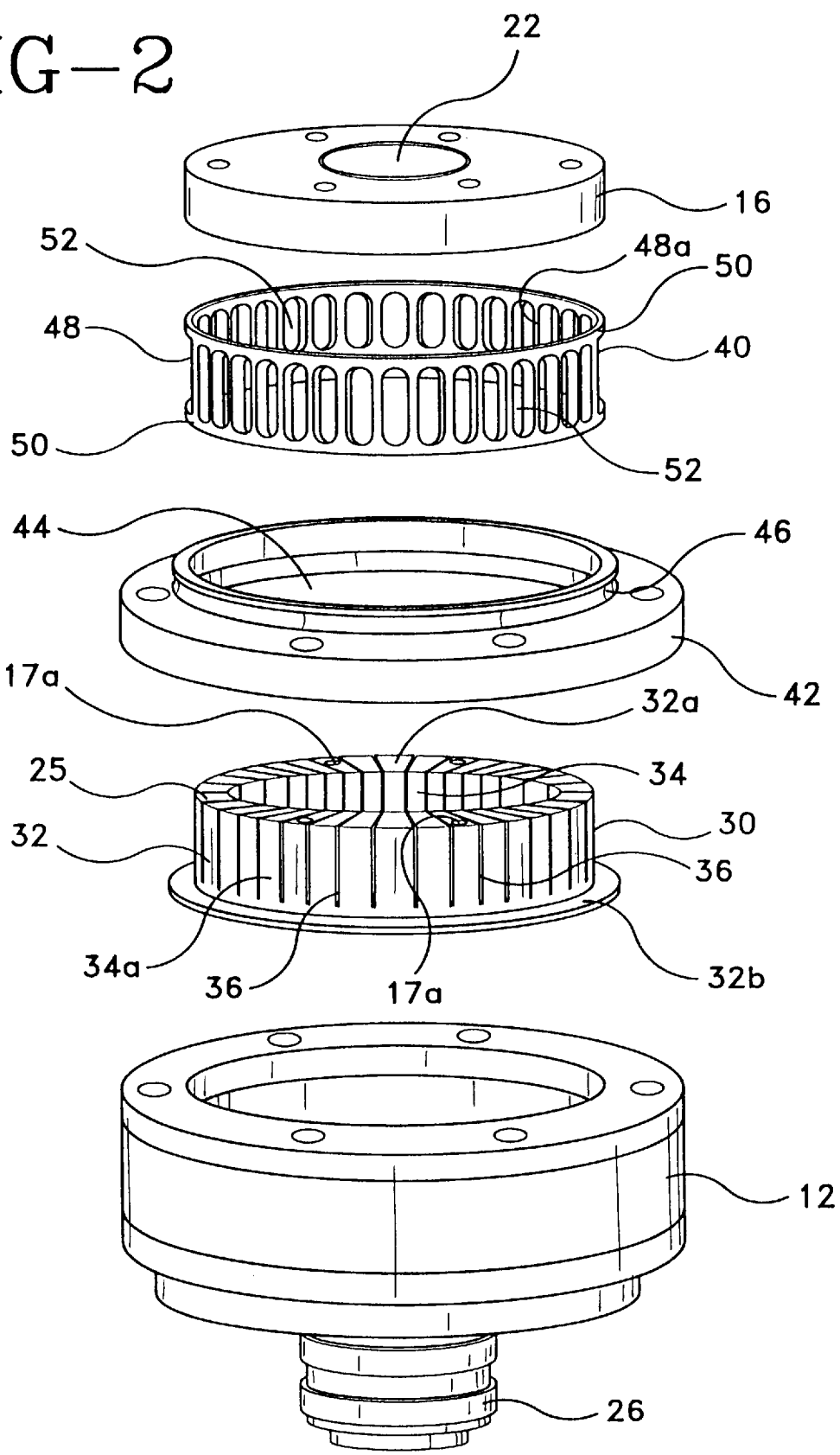
FIG. 2 is an exploded prospective view of the assembly of components forming the spinner head of the present invention.
Figure 3:
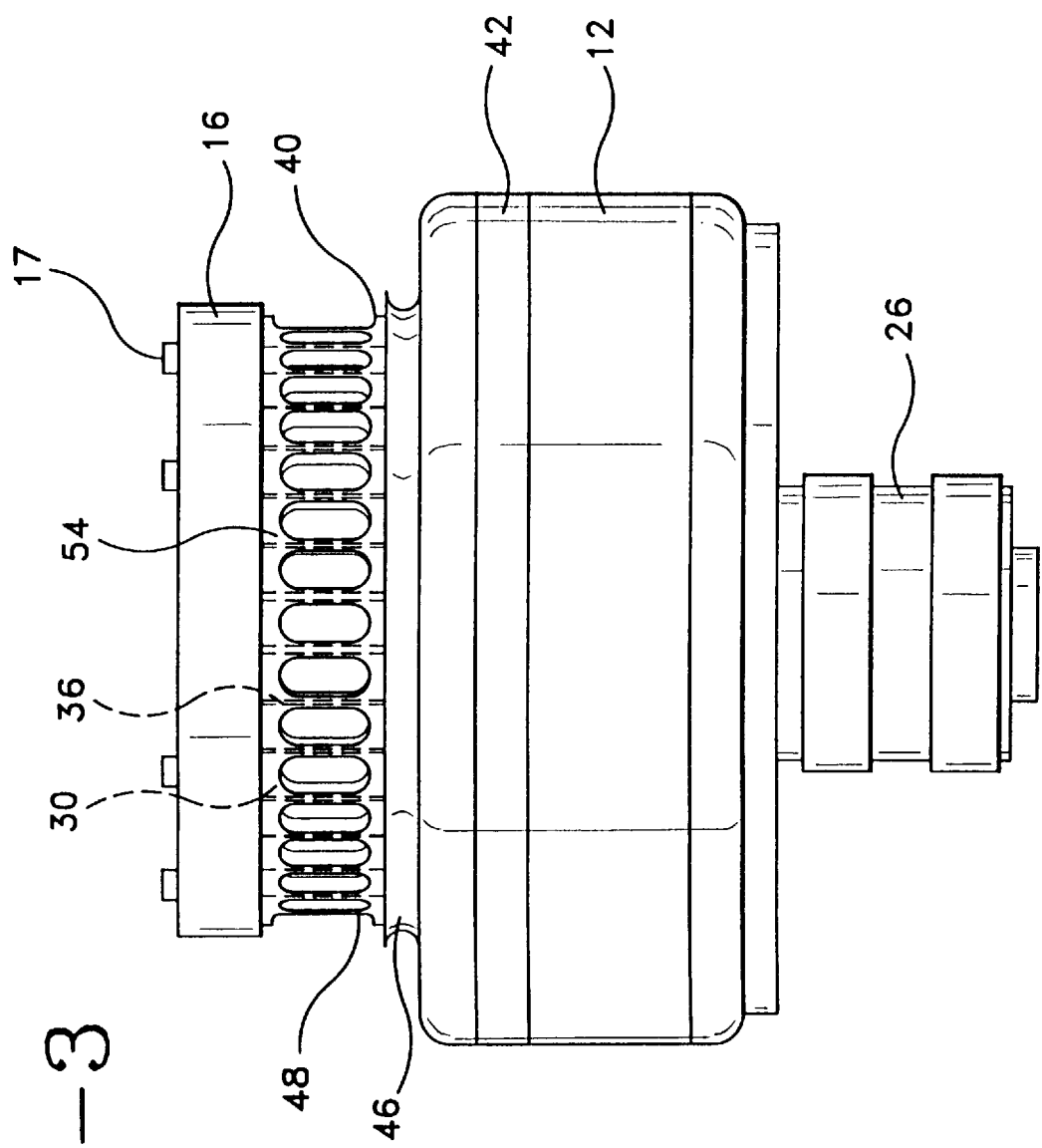
FIG. 3 is a front plan view of the assembled spinner head of FIG. 2.
Figure 4:
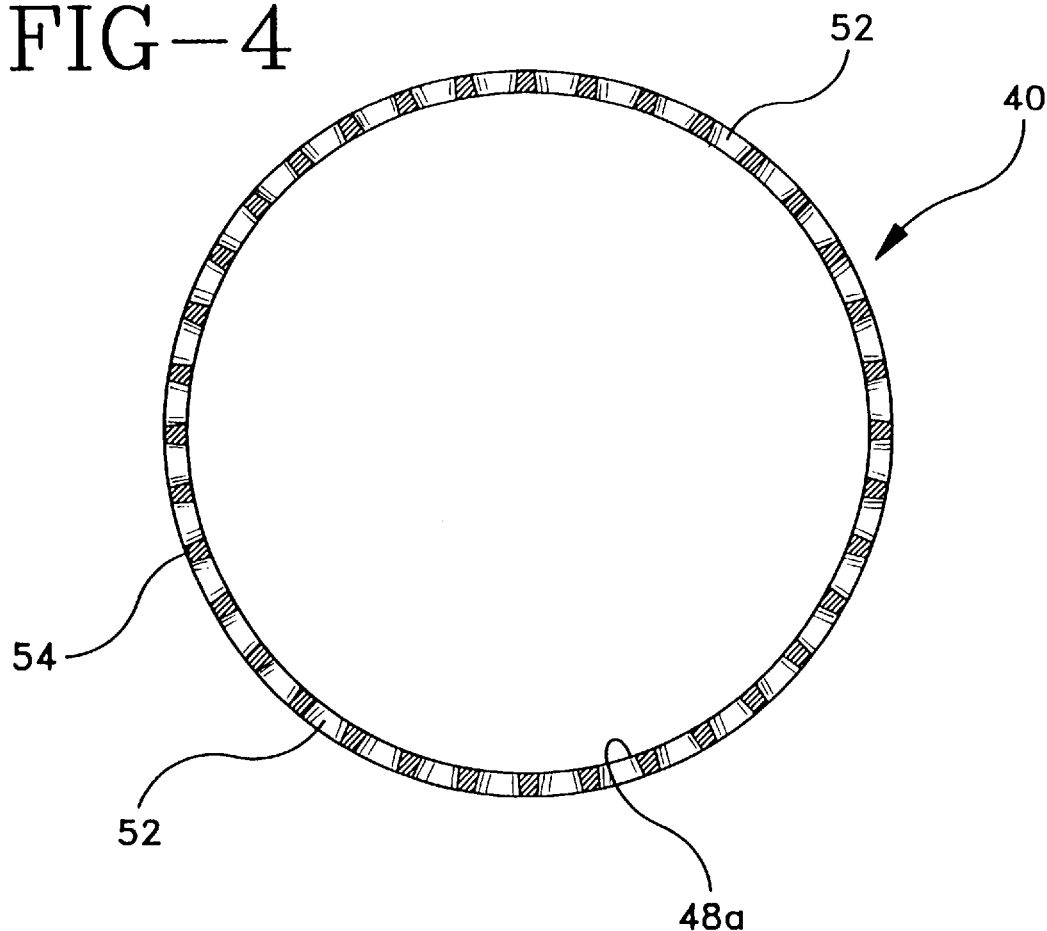
FIGS. 4 and 5 show in top and front plan views, respectively, a restricting ring used in combination with the spinner head of the present invention.
Figure 5:
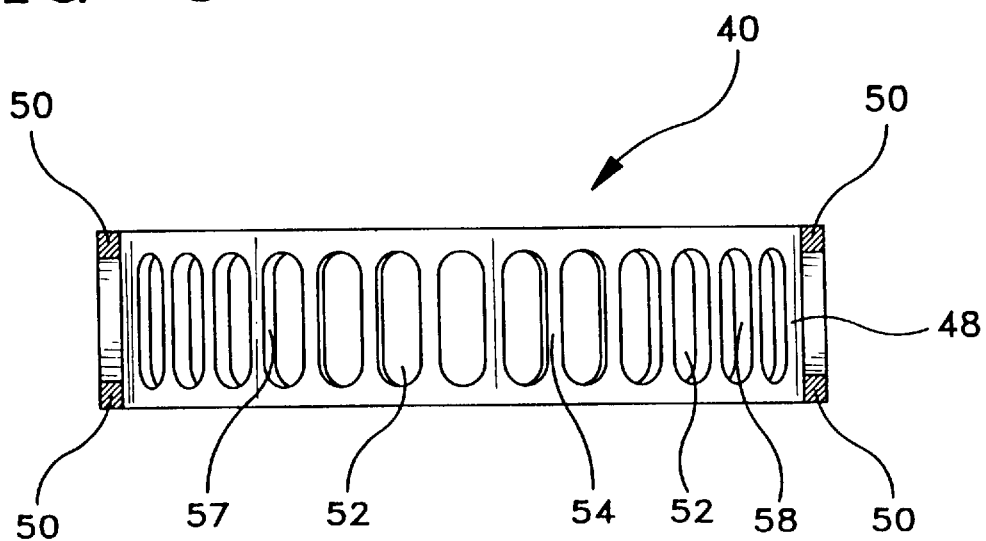

With additional reference to FIGS. 2 and 3, and as is also described in the above-incorporated '823 patent, the present invention in its preferred embodiment provides for the use of an annular housing 30. Annular housing 30 includes an upstanding annular sidewall 32 having a plurality of longitudinal cylindrical passages (not shown) extending between opposed upper and lower wall surfaces 32a and 32b. The size and location of the cylindrical passage are arranged in annular wall 32 to correspond to the size and locations of the tubular heating elements 20, which for clarity of description are shown in FIG. 1 but not in FIG. 2. Annular housing 30 is designed to fit over the array of tubular heating elements 20 with each individual tubular heating element 20 being resident within one of the passages within annular housing 30. Annular housing 30 may include mounting holes 17a on its upper wall 32a, which accommodate bolts 17 (FIG. 1) to secure annular housing 70 and cover 16. Chamber 25 which accommodates feedstock material is now defined by the inner cylindrical wall 34 of annular housing 30. In order to permit expulsion of feedstock material from spinner head 10, the annular sidewall 32 of annular housing 30 includes a plurality of longitudinal radially directed slots 36 therethrough. Slots 36 extend through sidewall 32 between upper wall 32a and lower wall 32b. Slots 36 are in communication with chamber 25 within spinner head 10 and with the exterior of spinner head 10 to permit expulsion of feedstock material therethrough. As described in the above-incorporated '823 patent, the processed feedstock material is expelled through slots 36. As the material is in contact with the opposed facing walls of the slots 36 as it is spun from spinner head 12, the morphology of the spun product is effected and such product tends to achieve a floss-like characteristic.

In order to further effect the morphology of the spun product exiting spinner head 10, the spinner head of the present invention further includes an annular restricting ring 40. Restricting ring 40 which is shown in further detail in FIGS. 4–6B is a generally annular member formed of heat conductive material such as stainless steel, and which is designed to fit in exterior circumscribing relationship about annular housing 30. In order to accommodate restricting ring 40 in proper location exteriorly about annular housing 30, spinner head 10 includes a lower supporting member 42 of generally annular construction. Supporting member 42 may be bolted or otherwise mechanically secured to base 12 with annular housing 30 extending through a central opening 44. Supporting member 42 includes an upwardly extending skirt portion 46 which assists in seating and locating restricting ring 40 in proper position about annular housing 30. Restricting ring 40 includes a generally cylindrical upstanding sidewall 48 having upper and lower extending annular lips 50. The lips 50 serve to create a space 51 (FIG. 6B) between the interior cylindrical sidewall 48a and the exterior sidewall 34a of annular housing 30.

The sidewall 48 of restricting ring 40 is generally an apertured member having a series of elongate generally oval-shaped openings 52 in spaced circumferential disposition thereabout. Openings 52 are defined by elongate thin wall portions 54 extending between the openings 52.

Figure 6A:
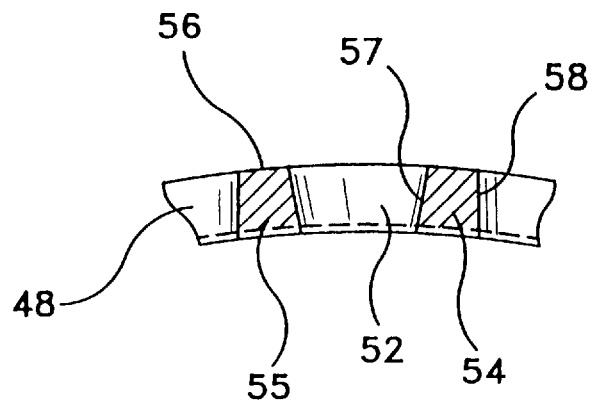
FIG. 6A is a partial sectional view of the restricting ring of FIGS. 4 and 5.
Figure 6B:
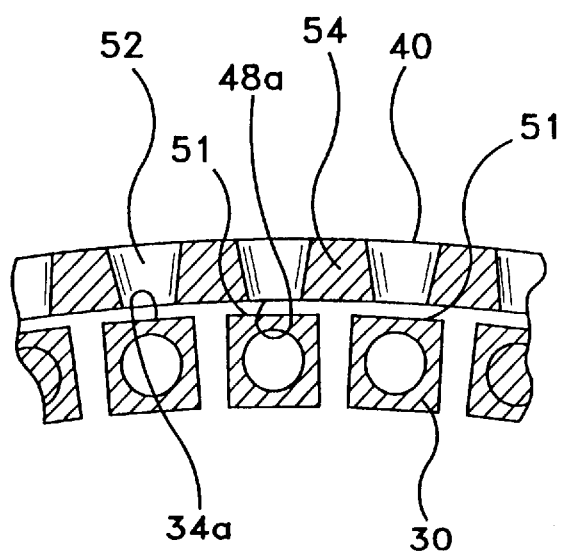
FIG. 6B is a schematic partial view of the restricting ring of FIG. 6A shown positioned about the annular housing of FIG. 2.

As particularly shown with reference to FIG. 6, each wall portion 54 is further defined by opposed interior and exterior edges 55 and 56 respectively, as well as by opposed side edges 57 and 58. In the preferred embodiment, the benefits of which will be described in further hereinbelow, the interior and exterior edges 55 and 56 as well as the side edges 57 and 58 form in cross-section, a generally trapezoidal configuration with the side edges 57 and 58 being tapered toward the exterior of the sidewall 48 so that the interior edge 55 is wider than the exterior edge 56. While the trapezoidal shape of the cross section of wall 54 is shown in FIG. 6 of the preferred embodiment, other cross sectional configurations may also be employed.

With specific reference to FIG. 3, restricting ring 40 is positioned over annular housing 30 in such a manner that each of the wall portions 54 extending between openings 50 is directly radially aligned with one of the slots 36 of annular housing 30. As the wall portions 54 span the height of sidewall 48, the wall portions 54 are positioned coextensive with each elongate slot 36. Furthermore, the upper and lower lips 50 position the internal edge 55 of wall portion 54 at a location slightly radially spaced from slots 36. Such spacing allows processed feedstock material to be expelled from annular housing 30 through slots 36. As the spun processed material exits annular housing 30, the interior edge 55 of wall portion 54 forms a barrier restricting direct expulsion of such material from spinner head 10. Thus, the material expelled from annular housing 30 contacts the interior edge 55 of wall portion 54. Thereafter the material must traverse a non-linear path about interior edge 55 and around side edges 57 and 58 so that the material may be expelled through openings 52 formed between adjacent wall portions 54. This tortuous path that the processed material must traverse before exiting spinner head 10, forms solid dispersions of floss morphology especially when used in combination with a polysaccharide mix. Furthermore, as the restricting ring 40 is slightly spaced from annular housing 30, it presents a cooler surface. By expelling the spun material onto a cooler surface, floss formation is enhanced. Also, the tortuous path presented by ring 40 provides a barrier which helps to decrease or prevent blow by, or blow through of unprocessed feedstock, thereby yielding less expulsion of unprocessed material.

The morphology of the spun product exiting spinner head 10 maybe further effected by additional modifications to the restricting ring 40 of the present invention. With reference to FIGS. 7A–7D, the interior edge 55 of wall portion 54 may be modified to include one or more flow paths extending transversely thereacross.

Figure 7D:
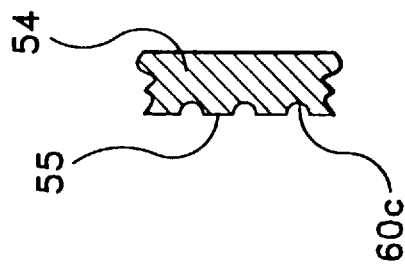
FIGS. 7A through 7D show alternate embodiments of flow paths formed in the restricting ring of the present invention.
Figure 7B:
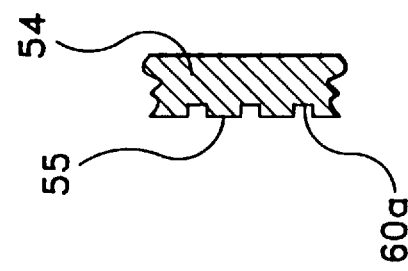
Figure 7C:
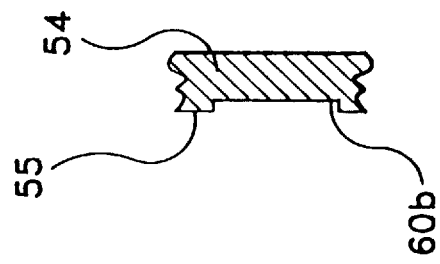
Figure 7A:
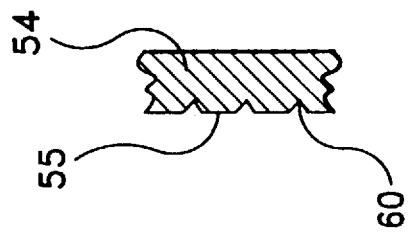

As shown in FIG. 7A, the flow paths may take the shape of generally V-shaped troughs 60 vertically spaced apart along the interior edge 55 of wall portion 54. Troughs 60 extend entirely across wall portion 54 being in communication with openings 52 on either side thereof (Fig.3).

Other configurations and numbers of troughs 60 are also within the contemplation of the present invention. For example, as shown in FIG. 7B, troughs 60a include a generally trapezoidal cross sectional shape. As shown in FIG. 7C, a single through 60b may be employed which has a generally rectangular configuration. Also, as shown in FIG. 7D, a plurality of generally U-shaped troughs 60c may also be employed.

The number, arrangement and configuration of the troughs lend to the formation of different spun product morphologies.

Particularly with respect to FIG. 7C, the elongate single through 60b may yield product morphology more in the nature of flakes which in certain circumstances may be desirable in the formation of foodstuffs.

Referring now to FIGS. 8–11, further embodiments of the present invention are shown. Spinner head 10 may support a modified restricting ring 70 particularly shown in FIG. 8. Restricting ring 70 is substantially similar to restricting ring 40 described hereinabove and is formed of a two-part split ring construction. Restricting ring 70 is generally formed of two semi-cylindrical members 72 and 74 which when joined form a full cylindrical ring. In all other respects the restricting ring 70 is constructed and used in a manner similar to restricting ring 40 shown above.

Figure 9:
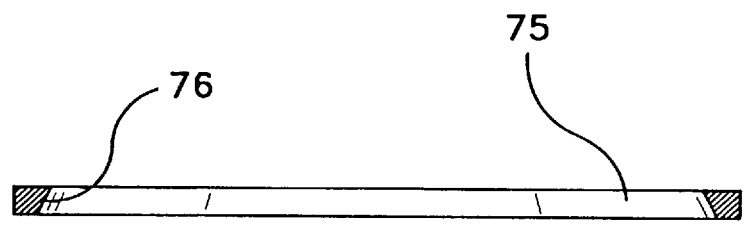
FIG. 9 shows a supporting collar used in combination with the split ring of FIG. 8.

In order to support split restricting ring 70 on spinner head 10 exteriorly about annular housing 30, spinner head 10 includes a pair of support collars 75 one of which is shown in FIG. 9. Collar 75 maybe formed of any heat resistant material and is generally an annular ring-like member having a chamfered internal surface 76. One collar 75 is positioned adjacent base 12 of spinner head 10 and is located within skirt 46 of annular member 42. The collar 75 is positioned within skirt 46 such that the chamfered surface 76 opens upwardly. The pair of split rings 72 and 74 forming restricting ring 70 may be seated on collar 75. The chamfered surface 76 serves to seat and locate the pair of rings 72 and 74 bringing the rings together and forming a unitary-like structure. Another collar 75 may be employed adjacent cover 16 to likewise hold and seat the restricting ring sections 72 and 74.

Figure 8:
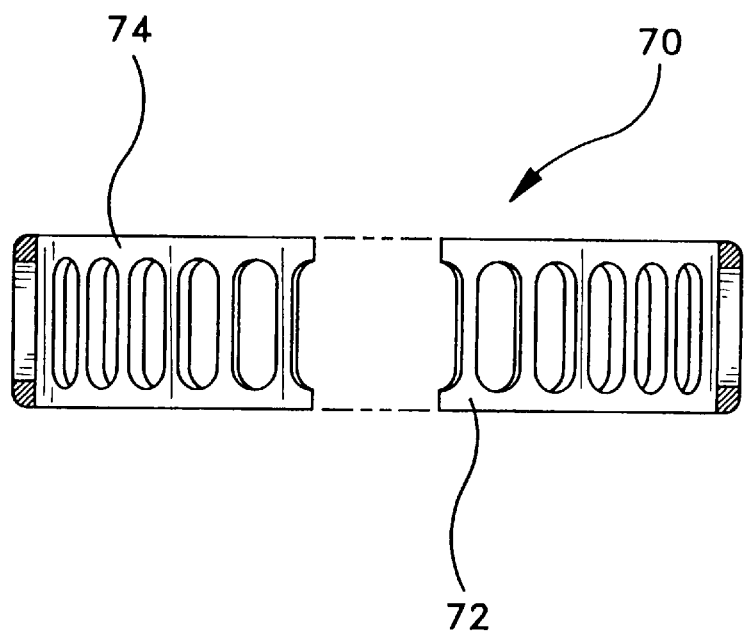
FIG. 8 shows in front plan view a two-part split restricting ring which may be used as an alternate embodiment in combination with the present invention.

The split ring construction shown in FIG. 8 allows the restricting ring 70 to be applied about annular housing 30 in situations where clear unrestricted access to the upper end of the housing 30 is not available. Rather than requiring full disassembly of the spinner head 10 to replace the restricting ring, as may be necessary for cleaning and/or replacement, the split construction of restricting ring 70 allows each section 72 and 74 to be inserted laterally and brought together by the seating of the sections between opposed washer 75. As shown in FIG. 11, one situation where unrestricted access is unavailable is where the spinner head 10', instead being supported from below, is supported from above. A central support rod 23' may be employed to support spinner head 10' from an overhead surface (not shown). A retaining plate 16' which substitutes for cover 16 holds the split retaining ring 70 about annular housing 30. The retaining plate 16' can be partially lifted off of ring 70 and the split sections 72 and 74 (FIG. 8) may be removed and replaced.

As mentioned above, the construction and use of the restricting rings of the present invention allows the enhanced formation of floss in the formation of spun product, especially saccharide-based products. Furthermore, it has been found that such construction allows saccharides to be mixed with fats such as oils in higher oil concentration than has heretofore been achievable.

Various changes to the foregoing described and shown structures would now be evident to those skilled in the art. Accordingly, the particularly disclosed scope of the invention is set forth in the following claims.

What is claimed is:

1. A spinner head comprising:

a base;

a cover aligned with and spaced from said base; and a plurality of discrete elongate heating elements defining elongate spaces therebetween said heating elements being positioned between said base and said cover and further defining a perimetrical configuration;

an annular housing having plurality of elongate spaced passages extending therethrough, said housing being positioned over said heating elements with said heating elements being resident within said passages, said housing including elongate perimetrically spaced radially directed slots between said passages and in alignment with said spaces between said heating element;

said base, said cover and said heating elements mutually defining a chamber for accommodating therein a solid non-solubilized feedstock material capable of undergoing physical transformation with the application of heat and force;

means for spinning said chamber for expelling said feedstock material through said spaces between said heating elements and effecting said material transformation;

feedstock engagement means disposed exteriorly about said perimetrical configuration defined by said annular housing containing said heating elements, said feedstock engagement means including elongate wall portions spaced radially from and directly aligned with said slots between said heating elements for direct contact with said feedstock expelled therefrom so as to alter the direction of travel of said expelled feedstock.

2. A spinner head of claim 1 wherein said feedstock engaging means includes a generally annular member positioned exteriorly about said heating elements, said annular member including an annular wall defining said wall portions.

3. A spinner head of claim 2 wherein said annular wall includes each said wall portion being aligned with one of said slots between said heating elements.

4. A spinner head of claim 3 wherein said wall portions are elongate and extend continuously coextensive with said elongate slots between said heating elements.

5. A spinner head of claim 4 wherein said annular wall defines a plurality of openings between said wall portions, said openings being in non-alignment with said spaces between said heating elements for permitting restricted passage of said expelled feedstock therethrough.

6. A spinner head of claim 5 wherein said wall portions include feedstock flow paths in communication with said openings for providing a directed flow path for said expelled feedstock material.

7. A spinner head of claim 6 wherein said flow paths extend transversely across said engagement surfaces.

8. A spinner head of claim 7 wherein said flow paths have a generally trough-shaped cross-section.

9. A spinner head of claim 8 wherein trough-shaped cross-section is generally V-shaped.

10. A spinner head of claim 8 wherein said trough-spaced cross-section is generally U-shaped.

11. A spinner head of claim 7 wherein each of said wall portions includes plural longitudinally spaced flow paths.

12. A spinner head of claim 5 wherein each of said wall portions include side walls, said side walls of adjacent wall portions defining said openings.

13. A spinner head of claim 12 wherein said side walls of each said wall portions extend in mutual tapered relationship.

14. A spinner head of claim 12 wherein said side walls of each said wall portion tapers inwardly in an exterior radial direction.

15. A spinner head of claim 2 wherein said annular member is an integrally formed ring positionable over said spaced apart heating elements.

16. A spinner head of claim 2 wherein said annular member is formed from a plurality of components assembled into a ring configuration about said spaced apart heating elements.

17. A spinner head of claim 5 further including a first support collar positioned adjacent said base and exteriorly about said heating elements; and a second support collar removably positioned adjacent to said cover;

said first and second support collars supporting said annular member about said heating elements.

18. A flow restricting device for use with a spinner head having an annular processing housing including elongate slots through which feedstock material is expelled, said flow restricting device including:

an annular member being disposed exteriorly about said spinner head annular housing, said annular member having feedstock engagement surfaces aligned and coexistive with said slots of said housing for altering the direction of travel of feedstock expelled from said slots.

19. A flow restricting device of claim 18 where said annular member includes a restricting ring positionable about said annular housing said restraining ring including a series of spaced apart openings for passage of processed feedstock therethrough.

20. A flow restricting device of claim 19 where said engagement surfaces are positioned between said spaced apart openings.

21. A flow restricting device of claim 20 when said restricting ring as an integrally formed one piece member.

22. A flow restricting device of claim 20 where said restricting ring is formed of multiple components.

23. A flow restricting device of claim 22 wherein said ring is formed by a pair of semi-cylindrical ring members.

24. A flow restricting device of claim 20 wherein said feedstock engagement surfaces have wall portions, said wall portions including feedstock flow paths which extend transversely across said engagement surfaces.

25. A flow restricting device of claim 24 wherein said flow paths have a generally trough-shaped cross-section.

26. A flow restricting device of claim 25 wherein said trough-shaped cross-section is generally V-shaped.

27. A flow restricting device of claim 25 wherein said trough-shaped cross-section is generally U-shaped.

28. A flow restricting device of claim 24 wherein each of said wall portions includes plural longitudinally spaced flow paths.

29. A flow restricting device of claim 24 wherein said flow paths have a generally trough-shaped cross section.

* * * * *